Aug. 23, 1960     E. C. GROGAN     2,949,922
CONTROLLER HAVING PROPORTIONAL BAND ADJUSTMENT
Original Filed Aug. 7, 1952
FIG. 1
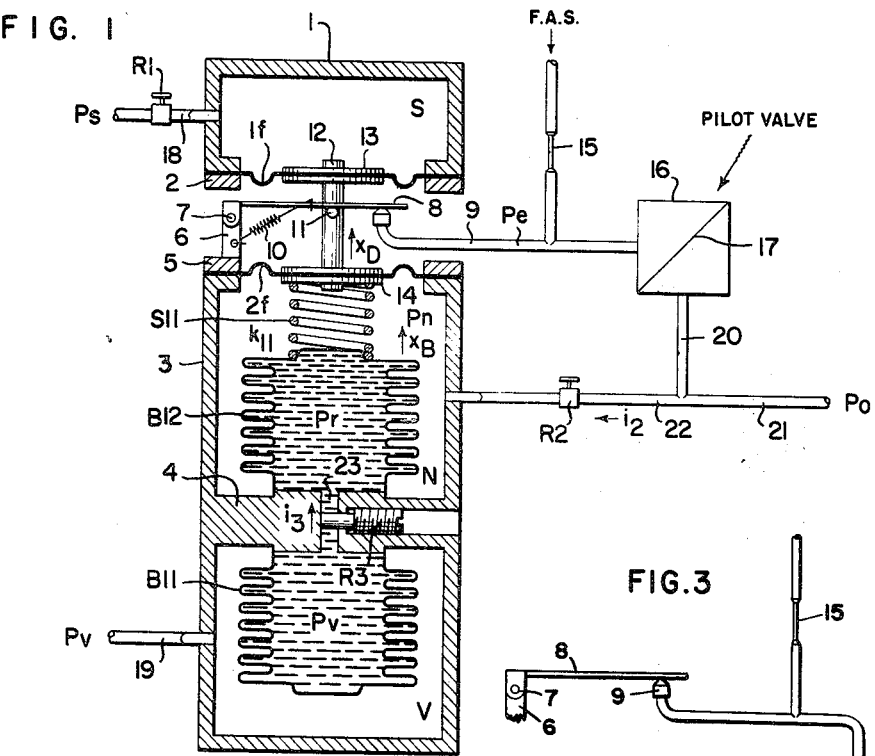
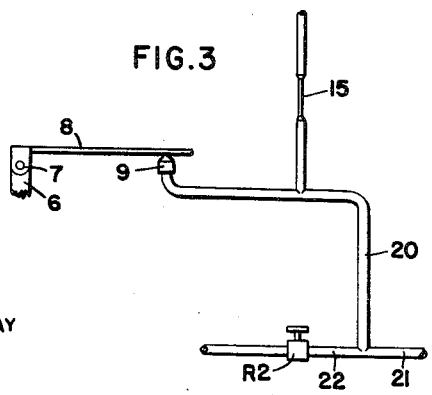
FIG. 3
FIG. 2
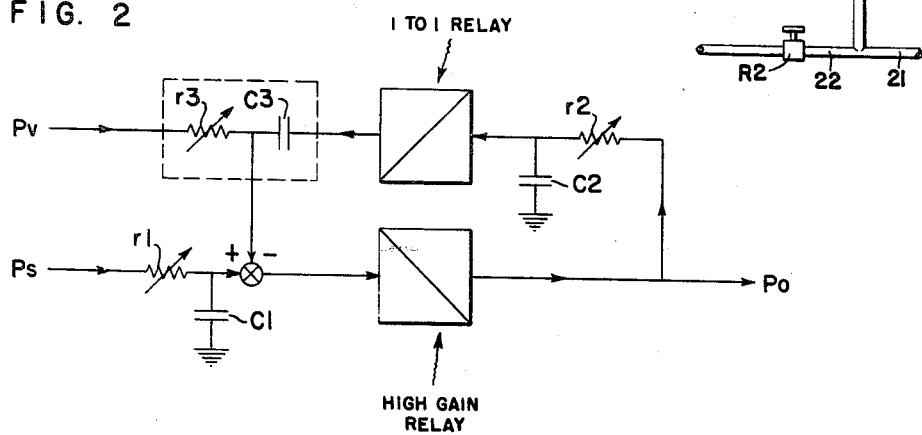
INVENTOR.
EDWARD C. GROGAN
BY Arthur H. Swanson
ATTORNEY.

United States Patent Office 2,949,922
Patented Aug. 23, 1960

2,949,922

CONTROLLER HAVING PROPORTIONAL BAND ADJUSTMENT

Edward C. Grogan, Philadelphia, Pa., assignor to Minneapolis-Honeywell Regulator Company, Minneapolis, Minn., a corporation of Delaware Original application Aug. 7, 1952, Ser. No. 303,070, now Patent No. 2,774,367, dated Dec. 18, 1956. Divided and this application May 11, 1956, Ser. No. 584,320

2 Claims. (Cl. 137—86)

The general object of the present invention is to provide a novel, elastic-fluid-pressure-actuated, controller, ordinarily an air controller, which is of the force balance type. The invention is adapted to provide proportional plus reset control, and when desired, to provide rate response also, and is characterized in particular, by its wide proportional band adjustment range. Theoretically, the possible range of proportional band adjustment obtainable by the use of the invention may extend from zero to infinity.

The proportional mode is a type of controller action in which a continuous linear relation exists between the value of the controlled variable and the position of the final control element. Thus, the action of the controlled variable is simply repeated and amplified in the valve action. For purposes of flexibility in application, a calibrated adjustment termed the proportional band (throttling range) is usually provided in the controller. The proportional band is defined as the range of value of the controlled variable which corresponds to the full operating range of the final control element. It is usually expressed as a percentage of the full scale range of the controller and the adjusting dial is so calibrated. For example, if a temperature controller has a range of 0 to 1000 degrees F. and functions to move a control valve through its operating range as a recording pen moves from 500 degrees to 700 degrees F., the proportional band adjustment would be 200/1000 × 100 or 20%.

The set point of the controller is at some intermediate value of the controlled variable within the proportional band, usually at or near the middle.

In my co-pending application, Serial No. 221,501, filed September 17, 1951, now Patent 2,712,321, issued July 5, 1955, I have disclosed and claimed an air controller adapted to provide proportional plus reset control which comprises separate setpoint, measured variable, positive feedback and negative feedback pressure chambers, co-operating to form a deviation unit. That unit operates to provide a control force which is a resultant of the pressures in the above mentioned chambers, and is varied in predetermined accordance with the extent and direction of deviations of a pressure which is indicative of the deviation of the value or condition of the measured variable from the predetermined set-point pressure, and is adjustable through a throttling range of considerable extent.

A primary object of the present invention is to provide a controller that will have an adjustable throttling range of practically unlimited extent.

A more specific object of the invention is to arrange the pressure chambers forming the controller and connect them to one another and to fluid pressure sources so that one of said portions with its associated connections will form a pressure and flow network for differentiating the error, or signal difference, between the process variable and set point pressures, and a second portion and associated connections will form a pressure and flow network for integrating the differential produced by the differentiating action of the first section.

In the preferred form of the present invention, the pressure chambers included in the two deviation units, and the pressure chambers forming an associated booster pilot section for transmitting a control pressure to a diaphragm motor valve or other ultimate control element, are combined in a single stack type air controller unit.

In the preferred form of the invention, the differentiating and integrating networks included in a controller, have circuit parameters adjustable to adapt the controller for use under widely different conditions.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is a schematic illustration or diagram of an air controller including essential features of the present invention; and Fig. 2 is a block diagram showing the components of the controller shown in Fig. 1.

Fig. 3 is a schematic illustration or diagram of a portion of an air controller showing a modification.

CONTROLLER STRUCTURE

Referring to Fig. 1, this invention is shown applied to a controller of the stacked type. This controller comprises a rigid cup 1 having a diaphragm 1f forming a wall thereof so as to enclose between the two a chamber S. Diaphragm 1f is secured to cup 1 by a ring 2 which engages the rim of the diaphragm 1f.

By means (not shown) cup 1 is attached to a rigid case 3 divided into two chambers by a partition 4. The upper of these chambers is the negative feedback chamber N. The lower of these chambers is the process variable chamber V.

Chamber N has a first flexible wall formed by diaphragm 2f secured to case 3 at its rim by a ring 5. Chamber N also has a second flexible wall thereof formed by a bellows B12.

Chamber V has a third flexible wall formed by bellows B11. A pipe 19 leads through the wall of chamber V and conducts air under pressure which corresponds to the value of the process variable to the chamber V.

Pipe 18 leads through the wall of cup 1 and conducts air under pressure to the chamber S. The pressure of the air in chamber S is controlled by a manually operated pressure regulator (not shown) and is set to a value representing the datum or value from which is desired to measure the variations in the controlled variable. Pipe 18 may contain a restriction R1 such as a needle valve or the like.

Diaphragms 1f and 2f are connected together at their centers by a shaft 12 which is secured to diaphragm 1f by a pair of discs 13 and which is secured to diaphragm 2f by a pair of discs 14. Shaft F bears a pin 11 which engages a flapper 8 pivoted at 7 to a support 6 on ring 5.

Flapper 8 is biased by spring 10 into engagement with a nozzle 9 to form a valve which is connected through restriction 15 to a filtered air supply (F.A.S.).

If desired, the valve formed by flapper 8 and nozzle 9 may control a pilot valve or a relay of the high capacity, non-bleed type disclosed in U.S. Patent 2,303,891; patented December 1, 1952 to C. B. Moore. Such a pilot valve or relay comprises a rigid case 16 divided into two chambers by a movable element 17, such as a diaphragm secured at its rim to the walls of the rigid case 16 or a piston slidable in the rigid case 16 as a cylinder. The nozzle 9 is connected to one of the chambers in the case 16. The other of these chambers contains an inlet valve and an outlet valve (not shown). To the second of these chambers is connected an output pipe 20 having a branch 21 through which the output pressure Po is led to the final control element such as an air-pressure-operated, final control valve.

Outlet pipe 20 has a second branch 22 which communicates with the chamber N through a second restriction R2 such as a needle valve.

The foregoing comprises a force-balanced, stack controller to which this invention is applied. This invention comprises means for adjusting the proportional band or throttling range at the controller over a wide range of values. This throttling range adjusting means comprises second restriction R2, second flexible wall or bellows B12, third restriction R3, and third flexible wall or bellows B11. The interior of bellows B12 is connected to the interior of bellows B11 by a passage 23 through the partition 4. Passage 23 is controlled by third restriction R3, such as a needle valve. A spring S11 having a relatively "stiff" gradient $k_{11}$ measured in pounds per inch bears at one end on diaphragm 2f and, at its opposite end, on the free end of bellows B12.

Operation of controller

The operation of the controller of this invention and of the means for adjusting the proportional band or throttling range thereof is as follows: Air under a pressure Pv, corresponding to the instantaneous value of the process variable, is applied to the chamber V. Air under pressure Ps at a value corresponding to the set point or datum from which it is desired to measure the deviations of the process is applied to the chamber S. Pressure Pv in chamber V acts on the free end of bellows B11 and produces the same pressure Pv in the liquid which fills the interior of bellows B11, the passage 23 and the interior of bellows B12. Pressure Pv is thus transmitted to the liquid in the interior of bellows B12 where it produces a pressure Pr. The free end of bellows B12 transmits the pressure Pr through spring S11 to diaphragm 2f.

Diaphragms 1f and 2f act in opposite directions on flapper 8. When the controller is in its normal, balanced or static condition, the pressures Pv and Ps are equal to one another.

If a variation occurs in the process variable, this causes a variation in the pressure Pv in chamber V. This change in pressure is transmitted to the liquid within bellows B11 and, after a delay imposed by the third restriction R3, to the liquid within the first bellows B12. This causes a change in the pressure Pr within the bellows B12 which is transmitted through spring S11 to diaphragm 2f.

This difference between the pressure applied to diaphragm 2f and the pressure applied to diaphragm 1f causes flapper 8 to move relative to nozzle 9 and thereby to vary the pressure Pe within the nozzle 9. This nozzle pressure Pe may be applied directly to the final control element but generally it is preferred to use a pilot valve or relay as shown in Fig. 1. In either case, the nozzle pressure Pe or the output pressure Po, which is directly proportional thereto, is applied to the chamber N in such a way as to produce a negative feedback pressure in chamber N and to produce a net force acting on the diaphragm 2f that is equal and opposite to the force acting on the diaphragm 1f. As shown in Fig. 1, an increase in the pressure Pv causes a decrease in the pressure Pe and consequently a decrease in the pressure Po. This pressure Po is applied to diaphragm 2f in such a way as to cause a negative feedback and to restore the flapper 8 substantially to its original position. In Fig. 1 an increase in the pressure Pv causes a decrease in the pressure Pn applied to the diaphragm 2f but this is not necessarily the case as an increase in the pressure Pv can cause an increase in the pressure Pn which is then applied to the opposite side of diaphragm 2f. However, the change in the pressure Pe or in the pressure Po, which is applied to the chamber N to produce the pressure Pn, is delayed by the restriction R2.

The pneumatic delay circuit formed by the pipe 20, the pipe 22, the restriction R2, and the chamber N has a mean time constant (T2). This time constant equals the reset time. The hydraulic, resistance-capacitance circuit (formed by the bellows B12, the restriction R3, and the bellows B11) also has a time constant (T3). The proportional band or throttling range of the controller equals the time constant T3 divided by the time constant T2 multiplied by 100%. Therefore, an adjustment of the time constant T3 would adjust the proportional band of throttling range of the controller.

In Fig. 1 the effective area of diaphragm 1f equals the effective area of diaphragm 2f. The effective area of bellows B12 equals the effective area of bellows B11. If it is desired to have the process variable pressure Pv equal the set point pressure Ps all these four areas must be made equal. That is to say the effective area of diaphragm 1f, the effective area of diaphragm 2f, the effective area of bellows B12, and the effective area of bellows B11 must all be equal.

Theoretical, mathematical analysis

Pe = nozzle pressure generated by flapper motion measured in pounds per square inch PV = the process variable pressure measured in pounds per square inch Ps = the set point pressure measured in pounds per square inch Pn = the negative feedback pressure measured in pounds per square inch Pr = the pressure within the interior of bellows B12 measured in pounds per square inch Po = the pressure put out by the controller measured in pounds per square inch $\lambda n$ = the pressure gain of the flapper-nozzle element 8, 9 and =

$$\frac{\partial Pe}{\partial x_D}$$

$g_p$ = the pressure gain of the pilot valve relay =

$$\frac{Po}{Pe}$$

measured in pounds per square inch divided by pounds per square inch

A = the effective area of the diaphragms 1f and 2f and of the bellows B12 and B11 measured in square inches $k_{11}$ = the gradient of the spring S11 measured in pounds per inch $x_B$ = displacement of bellows B12 measured in inches $x_D$ = displacement of diaphragm 2f measured in inches $C_n$ = the volumetric capacity of chamber N resulting from air compressibility and measured in cubic inches divided by pounds per square inch $r1$ = the resistance to fluid flow of the closed system which ends in the chamber S $r2$ = pneumatic resistance of restriction $$R2 \text{ and} = \frac{(Po - Pn)}{i_2}$$

$r3$ = hydraulic resistance of restriction $$R3 = \frac{\partial (Pv - Pr)}{\partial i_3}$$

$i_2$ = volumetric rate of fluid flow through restriction R2 measured in cubic inches per second $i_3$ = the volumetric rate of fluid flow through restriction R3 measured in cubic inches per second E = error signal The following analysis is based on small changes in the system variables and assumes:
a. Negligible mass for the moving parts
b. No time lags in the response in $Pe$ to changes in $x_D$
c. No time lags in the response in $Po$ to changes in $Pe$ Employing Laplacian notation, where $$s = \frac{d}{dt}; \frac{1}{s} = \int dt:$$

(1) $\quad i_3 = \frac{Pv - Pr}{R_3} = Asx_B$ (2) $\quad APr = (x_B - x_D)k_{11} + APn$ (3) $\quad APs = (x_B - x_D)k_{11} + APn$ (4) $\quad Pe = -\lambda_n x_D$ (5) $\quad Po = g_p Pe$ (6) $\quad \frac{Po - Pn}{R_2} = i_2$ (7) $\quad C_n sPn = i_2 + Asx_B - Asx_D$ From the foregoing equation, it is desired to obtain an expression for $Po$ as a function of $Ps$ and $Pv$.

Combining (2) and (3):

(8) $\quad Pv = Ps$

Combining (1) and (8):

(9) $\quad x_B = \frac{Pv - Ps}{AR_3 s}$

Combining (4) and (5):

(10) $\quad x_D = -\frac{Po}{\lambda n g_p}$

Combining (6) and (7):

(11) $\quad Pn = \frac{Po}{R_2 C_n S + 1} + \frac{R_2 AS}{R_2 C_n S + 1}(x_B - x_D)$ Combining (9), (10), (11), and (3):

(12)

$$Po\left[1 + \frac{k_{11}}{An g_D}(T2s+1)\right] = \frac{T2s+1}{T_3 s}\left\{Ps\frac{(T2+T3)}{T2s+1}s + 1 - Pv\right\}$$

where $$T2 = R_2\left(C_n + \frac{A^2}{k_{11}}\right)$$

$$T3 = R3\left(\frac{A^2}{k_{11}}\right)$$

For the case where, $$\frac{(\lambda n A g_D)}{k_{11}}$$

approaches $\infty$; and substituting into (12);

(13) $\quad Po = \frac{T2S+1}{T3s}\left\{Ps\left[\frac{(T2+T3)s+1}{T2s+1}\right] - Pv\right\}$ From Equation 13, the transfer function relating the dynamic response in $Po$ to dynamic variations in $Pv$ with $Ps$ regulated at a constant value is given by:

(14) $\quad \frac{Po}{Pv} = -\frac{T2s+1}{T3s} = -\left(\frac{T2}{T3}\right)\left[\frac{T2s+1}{T2s}\right]$ Those skilled in the art will identify Equation 14 with that of the proportional plus integral mode of control, where, $T2 =$ the integral time; and, $$\frac{R_2}{R_3}$$

is related to the proportional band.

Multiplying (13) by $(T3S)(T2S+1)$ $$Po(T_3 s)(T_2 s+1) = (T_2 s+1)(T_2+T_3)s+1)Ps - (T_2 s+1)^2 - Pv$$

$$T_2 T_3 s^2 Po + T_3 s Po = T_2(T_2+T_3)s^2 Ps + T_2 + T_2 + T_3 s Ps + Ps - T_2 s^2 Pv - 2T_2 s Pv - Pv$$

Using $$s^2 = \frac{d}{dt^2}; s = \frac{d}{dt}$$

(A)
$$T_2 T_3 \frac{d^2 Po}{dt^2} + T_3 \frac{dPo}{dt} = T_2(T_2+T_3) + 2T_2 + T_3$$
$$+ Ps - T_2 \frac{d^2 Pv}{dt^2} - 2T_2 \frac{dPv}{dt} - Pv$$

For $Ps =$ a constant (B) $\quad \frac{d^2 Ps}{dt^2} = 0$ (C) $\quad \frac{dPs}{dt} = 0$ (D) $\quad Ps - Pv = E; \frac{d^2 E}{dt^2} = -\frac{d^2 Pv}{dt^2}$ (E) $\quad \frac{D^2 Pv}{dt^2} = -\frac{d^2 E}{dt^2}$ (F) $\quad \frac{dPv}{dt} = -\frac{dE}{dt}$ Substituting B, C, D, E, and F, into A:

$$T_2 T_3 \frac{D^2 Po}{dt^2} + T_3 \frac{dpo}{dt} = E + T_2 \frac{d^2 E}{dt^2} + 2T_2 \frac{dE}{dt}$$

Substituting $$S = \frac{d}{dt}; s^2 = \frac{d^2}{dt2}$$

$$T_2 T_3 S^2 Po + T_3 s Po = E + T_2 s^2 E + 2T_2 s E$$

$$T_3 s Po(T_2 s + 1) = E(T_2 s^2 + 1)^2$$

$$\frac{Po}{E} = \frac{T_2 s + 1}{T_3 s}$$

(G) $\quad T_3 \frac{dPo}{dt} = T_2 \frac{dE}{dg} + E$

G is the solution to I

Multiply through by $T_2$ and differentiate (H) $\quad T_2 T_3 \frac{D^2 Po}{dg} = T_2^2 \frac{D^2 E}{dt^2} + T_2 \frac{DE}{dt}$ Combining G and H;

(I) $\quad T_3 T_2 \frac{d^2 Po}{dt^2} + T_3 \frac{DPo}{dt} = E + T_2^2 \frac{dE}{dt^2} + 2T_2 \frac{dE}{dt}$ Integrating both sides of I:

(J) $\quad Po + \frac{T_2}{T_3}E + \frac{1}{T_3}\int e dt$ (K) $$Po + \frac{T_2}{T_3}E + Edt$$

K is equation for the output response of a proportional and reset controller $$\frac{100\%}{\frac{T_2}{T_3}} = \Delta PB$$

$$\frac{1}{T_2} = \text{reset rate}$$

$$T_3 = \frac{R_2}{R_3} = \frac{T_2}{T_3}$$

Fig. 2 is a block diagram explaining the way in which the resistance and capacitance elements of the controller shown in Fig. 1 react to produce the results attained. The one-to-one relay is an isolation element resulting from the liquid filled bellows system. The high gain relay is provided by the flapper-nozzle-pilot valve relay system.

Fig. 3 shows a modification in which the pilot valve 16 is omitted and the air pressure Pe and the output pressure Po merge into one. In this modification, the position of the flapper 8 relative to the nozzle 9 controls the pressure of the air in pipes 20, 21 and 22. The pressure of the air in pipe 22 is applied through the first restriction R2 to the negative feedback chamber N where the pressure becomes the negative feedback pressure Pn.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

This application is a division of my co-pending application S. No. 303,070; filed August 7, 1952 now U.S. Patent 2,774,367; patented December 18, 1956.

Having now described my invention what I claim as new and desire to secure by Letters Patent is as follows:

1. A controller actuated by an elastic fluid, including, a first valve operable to derive a pressure containing an error signal in response to the pressure difference existing at any instant between a pressure proportional to the process variable and a pressure proportional to that value of said process variable which it is desired to maintain, a pilot valve connected under the control of said first valve and having an output connection and adapted to produce an output pressure in said output connection, a first restriction connected on its input side to the output connection of said pilot valve, a chamber connected to the output side of said first restriction and having a first flexible wall and a second flexible wall, said first flexible wall being connected so as to operate said first valve in the opposite direction to that in which said pressure difference operates said valve, a spring interposed between said first and second flexible walls, a second chamber having a third flexible wall therein, and a second restriction interposed between said second and third flexible walls and adapted to delay the flow of liquid therebetween, said second and said third flexible walls and said second restriction cooperating to define a chamber adapted to contain a liquid therein, said third flexible wall being exposed on its opposite side from said liquid to one of the following pressures, said pressure proportional to the process variable and said pressure proportional to that value of said process variable which it is desired to maintain.

2. A controller actuated by an elastic fluid, including, a valve operable to derive a pressure containing an error signal in response to the difference existing at any time between the value of the process variable and that value of the process variable which it is desired to maintain, a first restriction connected to the output side of said valve, a first chamber connected to the output side of said valve through said first restriction and having a first flexible wall and a second flexible wall, said first flexible wall being connected so as to operate said valve in the opposite direction to that direction in which said pressure difference actuates said valve, a spring interposed between and actuating said first and second flexible walls, a second chamber having a third flexible wall therein, and a second restriction interposed between said second and said third flexible walls and adapted to delay the flow of liquid therebetween, said second and third flexible walls and said second restriction cooperating to define a third chamber interposed between said first and second chambers and adapted to contain a liquid therein, said third flexible wall being exposed on its opposite side from said liquid to the pressure in said second chamber which pressure is selected from the class comprising the pressure proportional to the process variable and the pressure proportional to that value of the process variable which it is desired to maintain.

References Cited in the file of this patent

UNITED STATES PATENTS

| | | |
|---|---|---|
| 2,638,922 | Caldwell | May 19, 1953 |
| 2,698,023 | Eckman | Dec. 28, 1954 |
| 2,712,321 | Grogan | July 5, 1955 |
| 2,745,423 | Grogan | May 16, 1956 |
| 2,769,453 | DuBois | Nov. 6, 1956 |
| 2,774,367 | Grogan | Dec. 18, 1956 |
| 2,851,049 | DuBois | Sept. 9, 1958 |